United States Patent [19]
Schneider et al.

[11] Patent Number: 6,017,099
[45] Date of Patent: Jan. 25, 2000

[54] OSCILLATION DAMPER FOR DAMPING FLUID OSCILLATION IN A HYDRAULIC ANTI-SLIP CONTROL BRAKING SYSTEM IN MOTOR VEHICLES

[75] Inventors: Steffen Schneider, Tamm; Norbert Alaze, Markgroeningen; Dirk Hofmann, Ludwigsburg; Ulrich Pechtold, Tamm; Egon Stratmann, Schwieberdingen; Juergen Haecker, Markgroeningen; Hans-Friedrich Schwarz, Muehlacker; Norbert Mittwollen, Markgroeningen, all of Germany

[73] Assignee: Robert Bosch GmbH, Stuttgart, Germany

[21] Appl. No.: 08/981,670

[22] PCT Filed: May 25, 1996

[86] PCT No.: PCT/DE96/00917

§ 371 Date: Feb. 23, 1998

§ 102(e) Date: Feb. 23, 1998

[87] PCT Pub. No.: WO97/02971

PCT Pub. Date: Jan. 30, 1997

[30] Foreign Application Priority Data

Jul. 8, 1995 [DE] Germany ............ 195 24 920

[51] Int. Cl.$^7$ ...................................................... B60T 8/48
[52] U.S. Cl. .................................................. 303/87; 138/30
[58] Field of Search ............................. 303/87, 116.4; 138/30, 31

[56] References Cited

U.S. PATENT DOCUMENTS 5,460,438 10/1995 Hellmann et al. ........................ 303/87
5,820,227 10/1998 Sperd .................................... 303/87

*Primary Examiner*—Matthew C. Graham
*Attorney, Agent, or Firm*—Edwin E. Greigg; Ronald E. Greigg

[57] ABSTRACT

The vibration damper has a sleevelike shaped part comprising an elastomer as a diaphragm. The shaped part is received tightly on the opening end of a bore of a housing and surrounds an extension of a support body disposed in the bore. Provided on a side face of the extension is a groove, which communicates with a chamber in the extension. The shaped part, which on its outside is exposed to the brake fluid, with the inside of its jacket wall defines a hollow chamber, formed toward the extension of the support body and having atmospheric pressure. The vibration damper can be used in a slip-controlled hydraulic brake systems of motor vehicles.

13 Claims, 2 Drawing Sheets

OSCILLATION DAMPER FOR DAMPING FLUID OSCILLATION IN A HYDRAULIC ANTI-SLIP CONTROL BRAKING SYSTEM IN MOTOR VEHICLES

PRIOR ART

The invention is based on a vibration damper for damping fluid vibrations in a hydraulic, slip-controlled brake system for a motor vehicle.

One such vibration damper is already known (German Patent Disclosure DE 43 36 464 A1), having a circular, substantially flat diaphragm. A closure cap that retains the diaphragm in the housing bore acts as a fixed boundary wall for the hollow chamber, which through a bore in the cap communicates with the ambient air.

The vibration damper serves, in the drive slip control mode, to avert longitudinal vibration, caused by the pump type used in the brake system, of the brake fluid in the pump intake line, as well as to avoid vibration cavitation, so that the pump can supply an adequately large volumetric flow for a rapid pressure buildup in the wheel brake cylinders. Another goal of the vibration damper is to reduce the pressure surge that occurs in the line to the master cylinder when the drive slip control mode ends.

To achieve an adequate damping action, it is necessary to furnish sufficiently large spaces on both sides of the diaphragm, so that they can receive correspondingly large volumes of brake fluid and dispense them. The volume of these spaces depends essentially on the line volume between the master cylinder and the reciprocating piston pump, on the stroke volume and rpm of the reciprocating piston pump, and on the hydraulic elasticity of the system induced to vibrate by the pump. Since in modern brake systems the elements located between the master cylinder and the wheel brake cylinders, such valves, pumps, lines and the like, have undergone miniaturization of their structural volume and a tightly packed arrangement in a so-called hydraulic unit, primarily for the sake of saving weight and expense, difficulties arise structurally in disposing the known type of vibration damper, which requires a relatively large installation diameter, in the housing of the hydraulic unit.

ADVANTAGES OF THE INVENTION

The vibration damper of the invention has the advantage over the prior art that the volume required for the vibration damping extends over a chamber of small diameter and of corresponding axial length. This kind of shaping can typically be achieved without difficulties in a housing. Another advantage is that the requisite damping volume is furnished on both sides of the jacket wall of the shaped part forming the diaphragm. The support body advantageously assures that the shaped part will not collapse when pressure is imposed, yet nevertheless, with the aid of the groove in the side face, a sufficient compression volume with low rigidity is available. Finally, the fitting of the shaped part over the support body is advantageous upon assembly and in sealing in the bore of the housing.

By the provision disclosed herein, in cooperation with a flat extension end face and a dimensionally rigid bottom wall of the shaped part, an open communication is always achieved between the interior of the shaped part and the chamber of the extension.

With the refinement of the invention defined by hereinafter, it is advantageously attained that the jacket wall of the shaped part, on pressing against the side faces of the support body, conforms to the inside of the grooves, beginning at the foot of the support body. This prevents the inclusion of air bubbles between the jacket wall and the support body.

With the shaping of the bottom wall of the shaped part, the bore leading to the chamber in the support body is kept open in a simple way.

The provision defined in herein assures sealing among the support body, shaped part and housing bore, and the jacket wall of the shaped part is made taut and its bottom wall is kept in contact with the end face of the support body.

An advantage of the invention is that, a diversion of the hydraulic forces acting upon the support body to the housing is attained over a short distance.

To achieve an adequate damping effect in the intake-side pressure region, the chamber in the extension of the support body communicates with the ambient air. The embodiment of the invention including a covering cap assures the attainment of an air exchange protected against becoming soiled.

Such protection is further increased by the provision that the closure disk includes a plate which is impermeable to liquids and solids. To this extent, it is possible to dispense with a covering cap.

If an adequately large air volume connected to the chamber of the support body is furnished, then the bore of the housing can be closed by a perforation-free closure disk. In the event of a relatively unlikely break in the jacket wall of the shaped part, this refinement assures that no brake fluid can escape from the housing bore. This prevents a failure of the brakes equipped with the vibration damper of the invention. By adapting the diffusion resistance of the shaped part and of the component in the closure disk, the jacket wall of the shaped part is prevented from pressing against the support body over the course of time and reducing the damping action.

BRIEF DESCRIPTION OF THE DRAWING

Exemplary embodiments of the invention are shown in simplified form in the drawing and explained further in the ensuing description.

DESCRIPTION OF THE EXEMPLARY EMBODIMENTS

Figure 1:
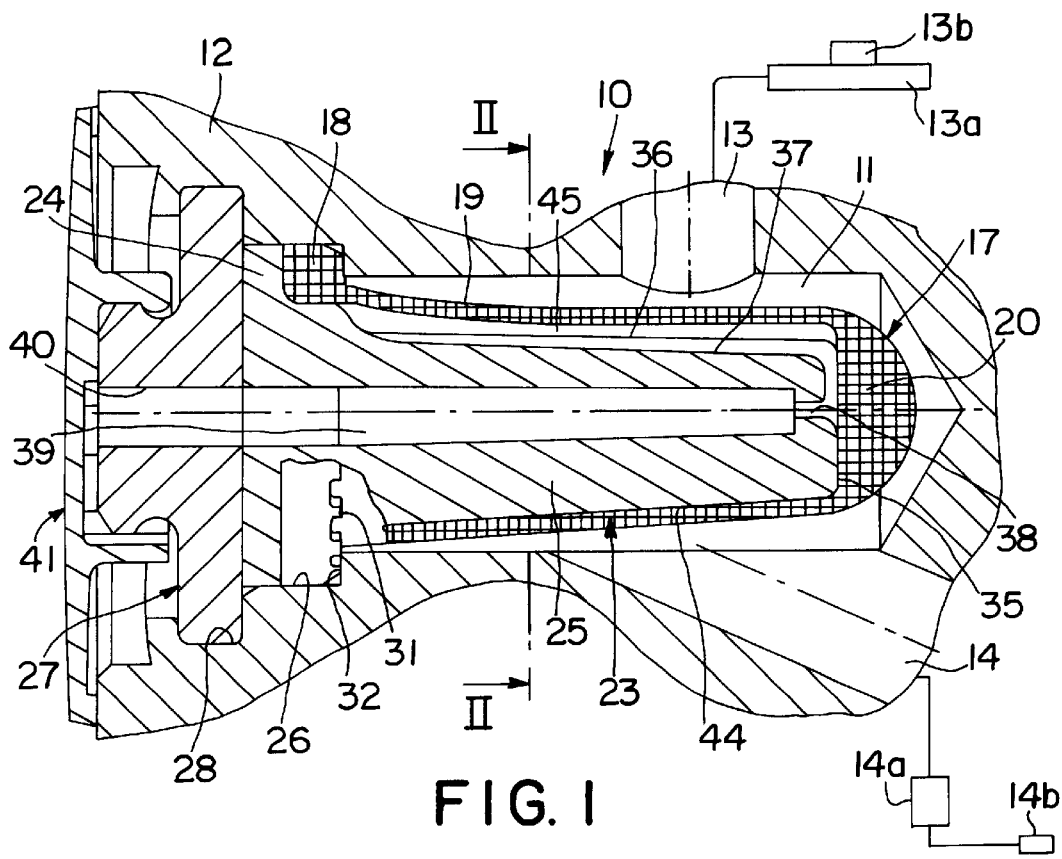
FIG. 1 shows a master cylinder, a longitudinal section through a vibration damper, substantially comprising an elastomeric shaped part, a support body, a closure disk in a housing bore a suction pump, and a brake cylinder.

A vibration damper 10, shown in FIG. 1 of the drawing, for damping fluid vibrations is intended for use in a hydraulic slip-controlled brake system of motor vehicles, of the kind described in the reference DE 43 36 464 A1 referred to at the outset. The vibration damper 10 is disposed in a bore 11 of a housing 12, which also receives valves, pumps, lines and other elements of the aforementioned brake system. The bore 11 of the housing 12 has a depth that is a multiple of its diameter. It communicates, through a line segment 13, with a master cylinder 13a having a storage container 13b for brake fluid, and through a line segment 14, it communicates both with the suction side of a self-aspirating reciprocating piston pump 14a and with at least one wheel brake cylinder 14b. With the pump, brake pressure can be generated in the wheel brake cylinder in the drive slip control mode.

The vibration damper 10 has a shaped part 17, acting as a diaphragm, which is made of the brake fluid-resistant elastomer ethylene-propylene-diene rubber (EPDM). From the longitudinal section, shown in FIG. 1, of a first exemplary embodiment of the vibration damper 10 it can be seen that the shaped part 17, embodied approximately in the shape of a hollow truncated cone, has a jacket wall 19, which begins at an opening edge 10 of increased cross section and ends in a bottom wall 20 of the shaped part, which wall is flat on the inside.

Also located inside the bore 11 of the housing 12 is a support body 23 with a circular-disklike foot 24, extending from which, coaxially with the bore 11, is an extension 25 in the form of a truncated pyramid. Both the support body 23 and the shaped part 17 slipped over the extension 25 have a length approximately equal to the bore depth. The foot 24 of the support body 23 is received fittingly in a first bore step 26 and is retained toward the mouth of the bore 11 with a closure disk 27, which is seated in a second bore step 28 and is secured on the housing 12 by being wedged in place.

In the first bore step 26, between the foot 24 and the extension 25 of the support body 23, its opening edge 18 is also received. The opening edge 18 is subjected to radial pressure and, seals off the part of the bore 11 located outside the shaped part 17 which is filled with brake fluid from the ambient air. The protrusions formed in a regular spacing on the opening edge 18 and oriented toward the bottom wall 20 of the shaped part 17, are supported on a radially extending face 32 of the first bore step 26. They have the effect that the opening edge 18 engages the foot 24 of the support body 23 with prestressing and keeps the support body in contact with the closure disk 27.

Figure 2:
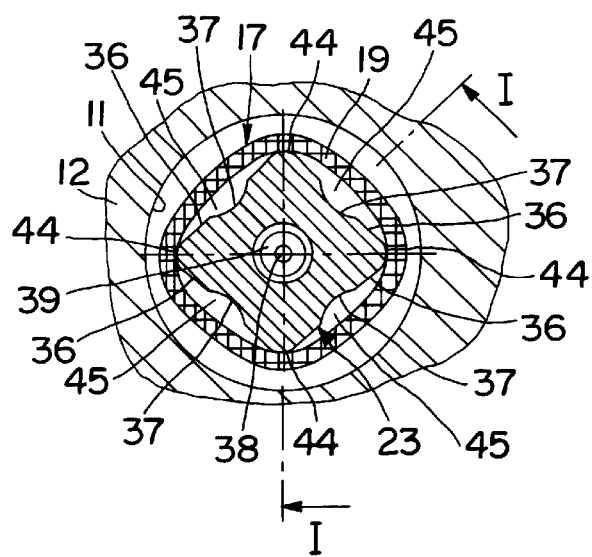
FIG. 2 illustrates a cross section taken along the line II—II through the exemplary embodiment of the vibration damper of FIG. 1.

As FIG. 2 shows, the extension 25 of the support body 23, in the shape of a truncated pyramid, is essentially square in cross section; that is, the extension has four side faces 36, extending between the foot 24 and an end face 35 remote from the foot and oriented toward the bottom wall 20 of the shaped part 17. In a departure from the exemplary embodiment shown, however, the extension 25 may also have an elliptical, triangular, pentagonal, polygonal, star-shaped or circular cross section. What is essential is that it not have any sharp edges. Beginning approximately at the foot 24, one groove 37 is formed into each side face 36 of the support body extension 25. The grooves 37 of all the side faces are also continued in the end face 35 of the extension 25, and they meet there in its center. There, they discharge into a bore 38 of relatively small cross section, which communicates with a chamber 39 of the extension 25. The chamber 39 penetrates the foot 24 of the support body 23 and communicates with the ambient air through a bore 40 in the closure disk 27. A covering cap 41 snapped onto the closure disk 27 largely protects the chamber 39 against the entry of moisture and foreign bodies.

The sleevelike, caplike or hatlike shaped part 17 has a jacket wall 19 that in the unmounted state is circular-annular in cross section. In the mounted state of the shaped part 17, when the master cylinder is not actuated and the pump is not in operation, the jacket wall 19 is elastically deformed in such a way that it is supported on rounded longitudinal edges 44 of the extension 25, and the wall portions associated with the side faces 36 that have the groove 37 assume a somewhat elongated cross section that departs from the circular-annular shape. Thus with its disposition in the vibration damper 10, the jacket wall 19 of the shaped part 17 defines a hollow chamber 45, toward the extension, which comprises a plurality of partial chambers and is separated from the bore 11 filled with brake fluid; the hollow chamber is filled with air and communicates with the ambient air. With its jacket wall 19, the shaped part 17 represents an elastic diaphragm between the brake fluid and air.

The size of the hollow chamber 45 can be varied by means of the long and short diameter and by the axial length of the jacket wall 19, the spacing of the jacket wall from the extension 25, the cross section of the extension 25, and the dimensions and number of the grooves 37 in the side faces 36. Aside from their termination toward the foot 37, the grooves 37 may have a constant depth and may decrease in their width toward the end face 35 remote from the foot, or they may have a constant width and an increasing depth toward the end face, or they may extend over only a portion of the respective side face 36. The number of grooves 37 in the side faces 36 can also be varied. What is essential, however, is that the transitions between the groove 37 and the side face 36 and end face 35 be rounded.

Figure 4:
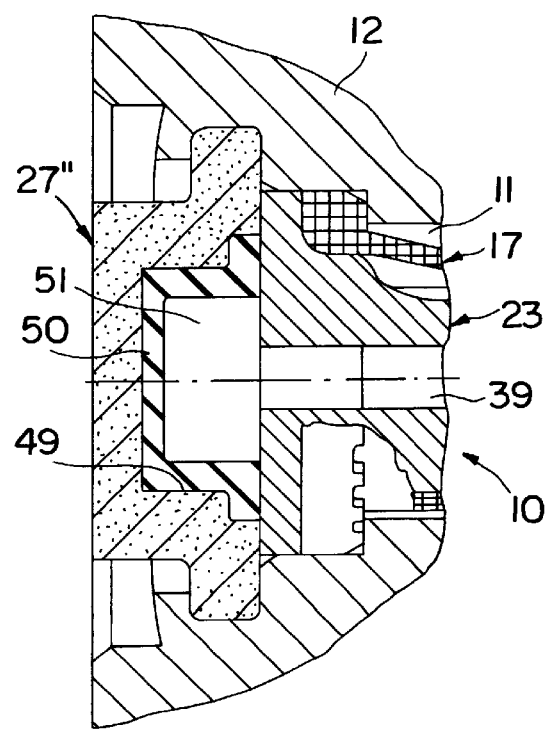

The mode of operation of the vibration damper 10 is as follows:

In operation of the reciprocating piston pump for the sake of drive slip control, both longitudinal fluid vibration and vibration cavitation can occur in the brake fluid-filled line segments 13 and 14 between the master cylinder and the suction side of the pump. The line portions 13 and 14 are shown in FIG. 4; see also German Published, Non-Examined Patent Application DE-OS 43 36 464, page 5. The periodic excitation of vibration is dictated by the structural type of the pump. With the aid of the vibration damper 10, which with the hollow chamber 45 furnishes an air-filled compression chamber and outside the jacket wall 19, with the bore 11, furnishes a brake fluid-filled expansion chamber, and additional elasticity or damping is introduced into the line segments 13 and 14, so as to shift the natural frequency of the column of brake fluid between the master cylinder and the reciprocating piston pump toward very low values, until the excitation by the pump occurs in the supercritical range. Longitudinal fluid vibrations and vibration cavitation are avoided. The volumetric flow of brake fluid pumped by the pump is made more uniform and is increased substantially or sharply.

During the operation of the vibration damper 10, the following mechanical processes occur in the shaped part 17: During a compression phase, the jacket wall 19 of the shaped part 17 is brought by the brake fluid in the bore 11 into contact with the side faces 36 of the support body extension 25. Depending on the imposition of pressure by the shaped part 17, the jacket wall 19 may also press against the grooves 37. In this process, the air located in the hollow chamber, that is, between the jacket face 19 and the side faces 36 and in the grooves 37 of the extension 25, is compressed, and some of it is diverted to the ambient air through the bore 38 and the chamber 39 of the support body. The embodiment of the grooves 37 as described earlier herein assures that the jacket wall 19 will conform to the groove, beginning at the termination of it toward the foot, which prevents the inclusion of air bubbles between the jacket wall 19 and the extension 25. Moreover, by means of the shaping of the bottom wall 20 of the shaped part 17 in the form of a relatively pressure-resistant spherical segment, such as a hemisphere, it is attained that the portions of the grooves located in the region of the end face 35 of the support body extension 25 and the bore 38, always remain free.

The extent of the deformation of the jacket wall 19 can be varied for instance by means of the properties of the material used for the shaped part 17, the thickness of the jacket wall 19, and the extent of the prestressing to which the jacket wall 19 is subjected after the shaped part 17 is slipped over onto the support body 23. Moreover, it may be expedient to make the jacket wall 19 of the shaped part 17 with an uneven thickness, in order to vary the compression volume. Furthermore, the characteristic curve of the vibration damper can be varied, for instance upon a compression stroke of the jacket wall 19, by means of a suitably selected diameter of the bore 38. For the communication of the hollow chamber 45 with the chamber 39 of the extension 25, it is possible to use slits or perforations of a different shape or a plurality of bores, instead of the single bore 38. In any case, it must be assured that even when stress on the shaped part 17 originates at the master cylinder, no injury to the jacket wall 19 will occur at these slits, perforations or bores.

The expansion volume required during the expansion phase of the vibration damper 10 is furnished by the bore 11 and defined by its dimensions. Upon the expansion of the jacket wall 19 of the shaped part 17 counter to the atmospheric pressure prevailing in hollow chamber 45, the corresponding portions of the jacket wall 19 move away from the side faces 36 of the support body extension 25. In the further course of the extension stroke, the jacket wall 19 can lift away from the longitudinal edges 44 of the extension 25 and can also press against the circumferential wall of the bore 11. Once again, it must be assured that in damage to the jacket wall at cross-sectional transitions of the bore 11 be prevented. This can be accomplished by means of increasing the cross section at the wear-threatened points of the jacket wall 19 or by means of a brake-fluid-permeable support cage in the region of the mouths of the line portions 13 and 14 into the bore 11.

Figure 3:
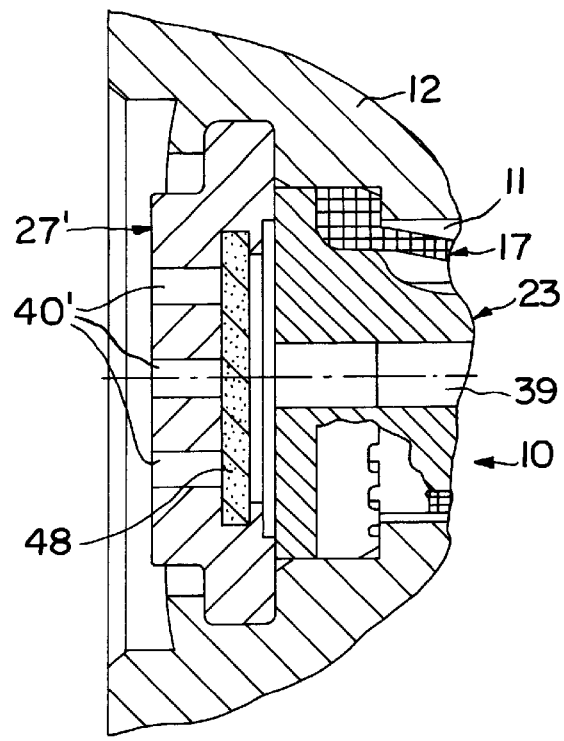
FIGS. 3 and 4 illustrates longitudinal sections of the portion toward the closure disk in further exemplary embodiments of vibration dampers.

In the second exemplary embodiment of the vibration damper 10, shown in FIG. 3, the following substantial departure from the first exemplary embodiment is made: a semipermeable plate 48 is received in the closure disk 27', toward the support body. On the one hand, this plate communicates with the chamber 39 in the extension 25 of the support body 23, and on the other, a plurality of bores 40' for connection to the ambient air are provided in the closure disk 27'. The semipermeable plate 48 assures that an exchange of air can take place between the chamber 39 and the atmosphere. Conversely, the plate 48 is impermeable to liquids, particularly water, and solids. In that case, a covering cap as in the first exemplary embodiment can be omitted.

In the third exemplary embodiment of the vibration damper shown in FIG. 4, the perforation-free closure disk 27" comprises a porous material, such a sintered metal. This makes the closure disk 27" permeable to air. A cup-shaped component 50, with a hollow chamber 51 that communicates with the chamber 39 in the support body extension 25, is disposed in a recess 49 of the closure disk 27", the recess being open toward the support body 23. The component 50 closes the chamber 39 off tightly against the porous closure disk 27". The component 50 comprises an elastomer, such as silicone rubber, which has a lower diffusion resistance for air than the material of the shaped part 17 and which is impermeable to brake fluid. This assures on the one hand that air diffused into the brake fluid through the jacket wall 19 of the shaped part 17 will be replaced with air that diffuses into the hollow chamber 51 through the component 50. On the other, if the shaped part 17 should break, it is assured that no fluid can escape from the bore 11 to the ambient air.

The foregoing relates to preferred exemplary embodiments of the invention, it being understood that other variants and embodiments thereof are possible within the spirit and scope of the invention, the latter being defined by the appended claims.

We claim:

1. A vibration damper (10) in a slip-controlled motor vehicle hydraulic brake system for damping fluid vibrations, comprising the following characteristics:

the vibration damper (10) is disposed in a line (13, 14) between a master cylinder having a storage container for brake fluid and a suction side of a reciprocating piston pump with which brake pressure is in at least one wheel brake cylinder upon operation of the pump;

the vibration damper (10) has a diaphragm (17), comprising an elastomer, which is tightly fastened in place at its edge and is disposed in a bore ( 11) of a housing (12) and which is exposed on one side to the brake fluid and with its other side defines a hollow chamber (45) which at least approximately has atmospheric pressure;

the hollow chamber (45) is defined in turn by a support body (23), against which the diaphragm (17) is acted upon by the brake fluid, the support body (23) has a foot (24), which is secured in the bore (11) and beginning at a tapering extension (25) extends into the bore (11), the extension being sheathed by a sleevelike shaped part (17) forming the diaphragm;

the extension (25) is provided, on at least one side face (36), with at least one groove (37);

the at least one groove (37) is located on the face of the extension (25) toward the shaped part (17);

the hollow chamber (45) is located between the extension (25) and the shaped part (17); and the hollow chamber (45) communicates with the chamber (39), which has a communication with the ambient air.

2. The vibration damper as defined by claim 1, in which the bore (11) of the housing (12) has a depth which is a multiple of its diameter, and both the support body (23) and the shaped part (17) have a length that is made to approximate the depth of the bore.

3. The vibration damper as defined by claim 1, in which the extension (25) of the support body (23) at least approximately forms a regular truncated pyramid with at least three side faces (36), and that the shaped part (17), in the unstressed state, is supported by a jacket wall (19) on the longitudinal edges (44) of the extension (25), which in the stressed state the jacket wall (19) also conforms both to the side faces (36) of the extension (25) and to the grooves (37).

4. The vibration damper as defined by claim 1, in which the at least one groove (37) is extended at an end face (35), remote from a foot, of the extension (25), and there discharges into a discharge bore (38) of smaller diameter, said discharge bore leads into the chamber (39), and that the shaped part (17) is supported on the end face (35), remote from the foot, of the extension (25) by a largely dimensionally rigid bottom wall (20) that on an inside is at least approximately flat.

5. The vibration damper as defined by claim 4, in which the groove (37), except for an end toward the foot, has a constant depth and decreases in its width toward the end face (35), remote from the foot, of the extension (25) or has the same width and a depth that increases toward the end face (35) remote from the foot.

6. The vibration damper as defined by claim 3, in which the jacket wall (19) of the shaped part (17) has a uniform thickness.

7. The vibration damper as defined by claim 4, in which the bottom wall (20) of the shaped part (17) is formed as a spherical segment.

8. The vibration damper as defined by claim 1, in which an opening edge (18) of the shaped part (17) is retained tightly in the bore (11) with radial prestressing between the support body (23) and a bore step (26) of the housing (12), while protrusions (31), formed onto the outside of the opening edge (18) and oriented toward a radial face (32) of the bore step (26), are supported on this radial face (32).

9. The vibration damper as defined by claim 8, in which the support body (23) is retained on the opening edge (18) of the shaped part (17), counter to the prestressing of the protrusions (31), by a closure disk (27) wedged into the bore (11) of the housing (12) toward a mouth of the bore.

10. The vibration damper as defined by claim 9, in which the chamber (39) in the extension (25) of the support body (23) communicates at least indirectly with the ambient air by means of at least one aperture (40) in the closure disk (27).

11. The vibration damper as defined by claim 10, in which the bore (11) of the housing (12) is largely closed on its outside with a covering cap (46) snapped onto the closure disk (27).

12. The vibration damper as defined by claim 10, in which the closure disk (27'), on the side toward the support body, has a semipermeable plate (48), for air exchange with the ambient air, that communicates with the chamber (39) in the extension (25) of the support body (23).

13. The vibration damper as defined by claim 9, in which the bore (11) of the housing (12) is closed by a perforation-free closure disk (27") comprising a porous material and toward the support body (23) has a recess (49), in which a component (50) that tightly closes the chamber (39) of the support body (23) is received, the component being of a material which compared with the shaped part (17) has a lesser diffusion resistance for air and which is impermeable to brake fluid.

* * * * *